(12) United States Patent
Althermeler

(10) Patent No.: US 12,370,732 B2
(45) Date of Patent: Jul. 29, 2025

(54) TRANSPORTING A FILM TUBE, BLOWN FILM LINE AND METHOD FOR PRODUCING A FILM

(71) Applicant: Windmöller & Hölscher KG, Lengerich (DE)

(72) Inventor: Jens Althermeler, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 17/599,591

(22) PCT Filed: Mar. 30, 2020

(86) PCT No.: PCT/EP2020/058990
§ 371 (c)(1),
(2) Date: Sep. 29, 2021

(87) PCT Pub. No.: WO2020/201225
PCT Pub. Date: Oct. 8, 2020

(65) Prior Publication Data
US 2022/0193973 A1    Jun. 23, 2022

(30) Foreign Application Priority Data

Mar. 29, 2019  (DE) ............... 10 2019 108 344.3
Oct. 11, 2019  (DE) ............... 10 2019 127 455.9

(51) Int. Cl.
*B29C 48/00* (2019.01)
*B26D 1/02* (2006.01)
(Continued)

(52) U.S. Cl.
CPC .......... *B29C 48/0022* (2019.02); *B26D 1/025* (2013.01); *B29C 48/0017* (2019.02);
(Continued)

(58) Field of Classification Search
None
See application file for complete search history.

(56) References Cited

U.S. PATENT DOCUMENTS 2,757,495 A    8/1956  Reichel
3,574,806 A    4/1971  Potter et al.
(Continued)

FOREIGN PATENT DOCUMENTS

CN    102009473    4/2011
CN    206665772    11/2017
(Continued)

OTHER PUBLICATIONS

Prüfungsantrag [Request for Examination] Dated Jan. 21, 2021 From the Deutsches Patent- und Markenamt [German Patent and Trademark Office] Re. Application No. 102019127455.9 and its English Summary. (6 Pages).
(Continued)

*Primary Examiner* — Michael M. Robinson

(57) ABSTRACT

The invention relates to a system (10) for transporting a film tube (2) in a blown film line (1) along a transport direction, having a guiding unit (51) for guiding the film tube (2), a bottleneck (13.1) at which a width (2.3) of the film tube (2) can be reduced, a severing apparatus (20) having at least one severing element (21) for severing the film tube (2), wherein the guiding unit (51) is arranged downstream of the bottleneck (13.1) in the transport direction of the film tube (2). The invention furthermore relates to a blown film line (1) and to a method (100) for producing a film.

13 Claims, 7 Drawing Sheets

(51) Int. Cl.
  *B29C 48/10*     (2019.01)
  *B29C 48/25*     (2019.01)
  *B29C 48/28*     (2019.01)
  *B29C 48/355*    (2019.01)
  *B29C 48/92*     (2019.01)
  *B29L 23/00*     (2006.01)

(52) U.S. Cl.
  CPC ...... *B29C 48/0018* (2019.02); *B29C 48/0019* (2019.02); *B29C 48/10* (2019.02); *B29C 48/2528* (2019.02); *B29C 48/28* (2019.02); *B29C 48/355* (2019.02); *B29C 48/92* (2019.02); *B29C 2793/0036* (2013.01); *B29C 2793/0054* (2013.01); *B29C 2793/0063* (2013.01); *B29C 2948/92295* (2019.02); *B29C 2948/92438* (2019.02); *B29C 2948/92447* (2019.02); *B29L 2023/001* (2013.01)

(56) References Cited

U.S. PATENT DOCUMENTS

| | | | |
|---|---|---|---|
| 5,073,617 | A | 12/1991 | Jorge et al. |
| 5,184,379 | A | 2/1993 | Bloo et al. |
| 5,789,042 | A * | 8/1998 | Jester .................. B29D 7/01 264/177.17 |
| 2005/0263936 | A1 | 12/2005 | Bosse |
| 2019/0233243 | A1 | 8/2019 | Sundermann |

FOREIGN PATENT DOCUMENTS

| | | |
|---|---|---|
| DE | 69100508 | 3/1994 |
| DE | 202004013959 | 1/2006 |
| DE | 202004017249 | 3/2006 |
| DE | 102016119281 | 4/2018 |
| EP | 0442253 | 12/1990 |
| GB | 2019306 | 10/1979 |
| WO | WO 91/12175 | 8/1991 |
| WO | WO 98/36882 | 8/1998 |
| WO | WO 2004/028780 | 4/2004 |

OTHER PUBLICATIONS

Aufforderung zur Zahlung Zusätzlicher Gebühren, Mitteilung über das Ergebnis der Internationalen Teilrecherche und Vorläufige Stellungnahme [Invitation to Pay Additional Fees, Communication Relating to the Result of the Partial International Search and the Provisional Opinion Dated Jun. 26, 2020 From the International Searching Authority Re. Application No. PCT/EP2020/058990. (13 Pages).

Internationaler Recherchenbericht und Schriftlicher Bescheid [International Search Report and the Written Opinion] Dated Sep. 24, 2020 From the International Scarching Authority Rc. Application No. PCT/EP2020/058990 and Its Translation of Search Report Into English. (19 Pages).

Prüfungsantrag [Request for Examination] Dated Nov. 11, 2022 From the Deutsches Patent- und Markenamt [German Patent and Trademark Office] Re. Application No. 102019127455.9 and Its Summary in English. (8 Pages).

Schriftlicher Bescheid der Internationalen Recherchenbehörde [International Preliminary Report on Patentability] Dated Sep. 28, 2021 From the International Bureau of WIPO Re. Application No. PCT/EP2020/058990 and Its Translation Into English. (19 Pages).

Notification of Office Action and Search Report Dated Feb. 24, 2023 From the National Intellectual Property Administration of the People's Republic of China Re. Application No. 202080026403.7 and Its Translation Into English. (27 Pages).

Notification of Office Action Dated Jan. 6, 2024 From the State Intellectual Property Office of the People's Republic of China Re. Application No. 202080026403.7 and Its Translation Into English. (30 Pages).

Mitteilung Gemäß Artikel 94(3) EPÜ [Communication Pursuant to Article 94(3) EPC] Dated Mar. 6, 2024 From the European Patent Office Re. Application No. 20716428.6 and Its Translation Into English. (10 Pages).

Weiterer Prüfungsbescheid [Further Notice of Examination] Dated Jul. 30, 2024 From the Deutsches Patent- und Markenamt [German Patent and Trademark Office] Re. Application No. 102019127455.9 and Its Translation Into English. (11 Pages).

* cited by examiner

TRANSPORTING A FILM TUBE, BLOWN FILM LINE AND METHOD FOR PRODUCING A FILM

RELATED APPLICATIONS

This application is a National Phase of PCT Patent Application No. PCT/EP2020/058990 having International filing date of Mar. 30, 2020, which claims the benefit of priority of Germany Patent Application Nos. 10 2019 127 455.9 filed on Oct. 11, 2019 and 10 2019 108 344.3 filed on Mar. 29, 2019. The contents of the above applications are all incorporated by reference as if fully set forth herein in their entirety.

FIELD AND BACKGROUND OF THE INVENTION

The invention relates to a system for transporting a film tube, a blown film line for producing a film, and a method for producing a film.

Blown film lines are known from the prior art. In this case, a film in the form of a film tube is extruded by an extrusion from a blow head. The film tube is then transported to a destination, such as a winding device or the like. In order to make the film tube transportable, it is often flattened in the process, i.e. a web material is produced from the cylindrical tube at a certain transport section, which web material comprises two flat tube sections of the film lying on top of each other. When transporting the flattened film tube, it is further frequently provided that the film tube is deflected, i.e. guided over a roller, for example, through which the transport direction of the film tube is locally changed. In this way, for example, a transport direction can be realized via an angle. However, it can be problematic that when the film tube is laid flat at the constriction point, air is entrained within the film tube, which can accumulate before the deflection. Due to the deflection, the parallel film sections are pressed against each other, so that air previously present in the tube is not entrained during the deflection, which can lead to bubble formation before the deflection and in particular after the constriction point. This effect can be enhanced if, after the extrusion of the film tube by the blow head, a film bubble is created by an air supply before the film tube is flattened. In particular, an increased air pressure within the film bubble may promote entrainment of air through the constriction point. However, air accumulated in the system in this way can have a detrimental effect on the quality properties of a film. On the one hand, the film can be locally overstretched by the air bubble, so that plastic deformations are already introduced into the film during production. Furthermore, due to local interactions between the film in the area of the enclosed air and the guide unit, contamination can be pressed into the film, so that further quality losses are to be feared here as well.

SUMMARY OF THE INVENTION

It is an object of the present invention to at least partially eliminate the aforementioned disadvantages known from the prior art. In particular, it is an object of the present invention to avoid and/or reduce air accumulation during the production of a film, in particular in a blown film line, preferably without impairing method and/or line safety.

The foregoing object is solved by a system having the features of claim 1, a blown film line having the features of the present invention, and a method having the features of the present invention. Further features and details of the invention result from the respective dependent claims, the description and the drawings. Features and details described in connection with the system according to the invention are of course also valid in connection with the blown film line according to the invention and/or the method according to the invention, and vice versa in each case, so that reference is or can always be made mutually with respect to the disclosure of the individual aspects of the invention.

According to the invention, a system for transporting a film tube of a blown film line along a transport direction is provided. The system has a processing unit with a guide unit for guiding the film tube, in particular when transporting the film tube, and a constriction point at which a width of the film tube can be reduced. Furthermore, the system comprises a cutting device with at least one cutting element, in particular for cutting the film tube. Thereby, the guide unit is arranged downstream of the constriction point in the transport direction of the film tube. Furthermore, the cutting device is configured in such a way that only a first tube side of a tube section of the film tube can be cut by the cutting element, so that air accumulated at the processing unit, in particular between the constriction point and the guide unit and/or in front of the constriction point, can be released through the, in particular cut, tube section, in particular during transport of the film tube.

The system for transporting the film tube can preferably be arranged downstream of a blow head of the blown film line for producing the film tube in the transport direction of the film tube within the blown film line. The system may thereby be a passive system, which in particular has no drive, or an active system, which enables active transporting and/or conveying of the film tube. In an active system, the system may comprise a drive unit for moving the film tube along the transport direction. In a passive system, a drive unit for moving the film tube along the transport direction may advantageously be located downstream of the system. In particular, transporting the film tube may comprise guiding the film tube and/or influencing the transport direction of the film tube. In particular, the film tube may be passable through the system as a continuous material. Preferably, the film tube comprises a plastic film. Furthermore, it may be provided that the film tube has a cylindrical extension at least before reaching the system. When transporting the film tube along the transport direction, the film tube may be subjected to a plurality of changes in direction, which may be provided in particular by the guide unit or a plurality of guide units.

In particular, the processing unit can form a section of the system in which at least part of the transport of the film tube can be carried out. The processing unit may thereby comprise a plurality of guide units, a flattening device and/or further components for transporting or processing the film tube. It is also conceivable that the processing unit is formed by a stretching unit for stretching and/or stretching film material of the film tube, comprising the constriction unit and the guide unit. At the processing unit, the air can accumulate during operation of the system, for example, directly in front of the constriction point and/or between the constriction point and the guide unit, in particular directly in front of the guide unit. In particular, the air may accumulate at a component of the processing unit. Preferably, the guide unit may comprise a deflection cylinder, which may be of fixed configuration or may be configured as a rotatable roller. In particular, the film tube changes the transport direction by being deflected. By the width of the film tube, which can be reduced at the constriction point, can be understood in particular an extension and/or a diameter of the film tube, which can be reduced at the constriction point. In particular, the width may be measurable perpendicular to the transport direction. The constriction point may, for example, result from a transport requirement of the film tube. The fact that the guide unit is arranged downstream of the constriction point in the transport direction of the film tube can be understood in particular in such a way that the film tube first passes through the constriction point during transport and then passes through the guide unit. Preferably, the guide unit can be configured for deflecting the film tube. Thus, the guide unit may be configured as a deflection unit. However, it is equally conceivable that the guide unit guides the film tube and, in particular, does not influence the transport direction of the film tube. In particular, the guide unit may be drivable in order to actively promote the transport of the film tube. Furthermore, it is conceivable that the constriction point is formed by a further guide unit.

The cutting element of the cutting device may be a mechanical cutting element. In particular, the cutting element may be configured, for example, as a cutting knife. Preferably, a cutting force of up to 10 N, preferably of up to 5 N, can be applied to the first tube side by a mechanical cutting element. Furthermore, it is conceivable that the cutting element is an optical and/or thermal cutting element. For example, the cutting element may comprise a laser for this purpose. In particular, the cutting element is configured to create an opening, preferably in the form of a severing cut, in the first tube side. By a cutting of the film tube by the cutting element it can be understood in particular that an access or an opening to the interior of the tube is created in the first tube side, i.e. in particular the film material is completely pierced by the cutting element at least at certain points. During the cutting operation, an opening is preferably made in the film tube without cutting. Thus, the severing device may also be referred to as a cutting device and/or the severing element may be referred to as a cutting element. Preferably, the cutting element may be introduced into the film tube at least in regions, wherein the film tube is, for example, pierced and/or cut at least in regions. In particular, the cutting element may be configured to be mechanically cut into the film tube. In this regard, it is further conceivable that the cutting element comprises one or more needles. Thus, it may be provided that the cutting element is configured as a needle roller which, for example by rotating the needle roller, can introduce needles selectively into the film tube, i.e. sever the first tube side. The fact that only a first tube side of the tube section of the film tube can be cut through by the cutting element can be understood in such a way that the film tube is not completely cut through. In particular, after the film tube has been laid flat, only one of two at least partially superimposed film layers may thus have a severing cut. By cutting the cutting element into the first tube side, an access to the tube interior can thus be created, through which a fluid communication of the tube interior and an outer region of the film tube can be realized. If the tube section thus passes the constriction point, an excess pressure present within the film tube can be relieved, in particular after the constriction point. In particular, air can thus escape from the film tube through a severing cut introduced by the cutting element into the first tube side or into the tube section during cutting, in particular when the tube section passes the region between the constriction point and the guide unit. Preferably, the cutting element is configured for cutting the film tube during operation of the blown film line and/or during transport of the film tube.

Thus, air in the system, in particular during transport of the film tube, can be reduced in a simple manner, which could possibly have a detrimental effect on the quality of the film tube. For example, it may be provided that the cutting of the tube section by the cutting element is feasible when a certain amount of air has accumulated in the system or when a predetermined period of time has elapsed during the transport of the film tube. For example, the cut tubular section may be removed or marked prior to winding and/or prior to further processing of the tubular film.

Furthermore, in a system according to the invention, it may advantageously be provided that a flattening device is provided for flattening the film tube to form two film layers at least partially lying on top of one another, the constriction point being formed by the flattening device. In particular, it may be provided that the flattening device comprises squeezing rollers through which the film tube is constricted at the constriction point, so that two at least partially superimposed film layers are provided downstream of the constriction point. By the superimposed film layers may be understood, for example, film sections aligned parallel or substantially parallel. Preferably, the flattening device may comprise a plurality of guide elements along which the film tube is guided in the flattening device, so that the width of the film tube is reduced, in particular in a tapered and/or tapering manner, up to the constriction point. At the constriction point, it may be possible to achieve contact between the film layers, at least in sections. By flattening the film tube, the film tube can be prepared for a separation of the film layers on two winding devices. The flattening device can in particular follow a film bubble, which can be generated in the transport direction of the film tube downstream of a blow head of the blown film line. As a result, an increased internal pressure of the film tube can be provided in the region of the film bubble, through which an entrainment of air into further transport sections of the system can be favored in the region of the flattening device. Thus, the use of the cutting device for releasing the accumulated air after the flattening device can be particularly advantageous.

It is further conceivable in a system according to the invention that the cutting device comprises a transverse drive for moving the at least one cutting element transversely to the transport direction of the film tube and/or that the cutting element is set at an oblique angle to the transport direction of the film tube. By a movement of the cutting element transversely to the transport direction, it can be understood in particular that the cutting element is movable perpendicularly to the transport direction of the film tube. As a result, for example, an oblique angle of a severing cut can be obtained when the cutting element is cut into the film tube. This may already result from a movement of the cutting element transversely to the transport direction, if the film tube is simultaneously moved in the transport direction. If the cutting element is set at an oblique angle to the transport direction of the film tube, an oblique cut can be obtained even if the cutting element is inserted briefly into the film tube. By an oblique severing cut, an escape of the accumulated air may be improved. Furthermore, further tearing of the severing cut may be reduced or prevented during further transport, for example when passing further constriction points. Thus, further damage to the film layers may be avoided and thus the quality of the film product may be improved. The transverse drive may, for example, comprise a pneumatic drive, for example in the form of a pneumatic cylinder, acting in particular on one side. Preferably, the transverse drive may comprise a resetting device, for example in the form of a spring, for resetting the cutting element after cutting the first tube side of the tube section.

Furthermore, in a system according to the invention, it may advantageously be provided that the cutting device comprises a drive for moving the at least one cutting element in the direction of the film tube. By moving the cutting element in the direction of the film tube, it may be understood that the entire cutting element is moved towards the film tube. Thus, for example, in the case of a mechanical cutting element, a blade may be inserted into the film tube. The drive may be pneumatic, electric and/or hydraulic. Preferably, the transverse drive and the drive may be combined in one drive, for example to achieve a perforation of the film tube. Advantageously, the drive can enable a punctual and/or area-wise cutting of the cutting element into the film tube.

Furthermore, it is conceivable in a system according to the invention that the cutting device comprises a tube guide, in particular in the form of a roller, through which the film tube can be moved towards the cutting element in certain regions. Through the tube guide, the transport direction of the tube of film can be locally changeable for cutting the tube of film through the cutting element. Thus, for example, the cutting element of the cutting device may be rigid. If the film tube is moved towards the cutting element during transport, i.e. while the film tube is moving relative to the cutting element, the film tube can be cut by the cutting element, in particular along the transport direction. As a result, it is not necessary that the cutting is performed by an active cutting movement of the cutting element. Furthermore, for example, the tube guide may be movable towards the cutting element up to a predetermined nominal distance. However, it is also conceivable that both the tube guide and the cutting element can be moved towards each other to achieve the predetermined nominal distance. The predetermined nominal distance can thus define a height of an enclosed air bubble in the film tube, from which the film tube is cut in. It is thus conceivable that, as a result, cutting only takes place automatically from a certain size of the enclosed air bubble, so that unnecessary damage to the film tube can be avoided.

It is further conceivable in a system according to the invention that the cutting device comprises a housing, wherein the cutting device can be brought into an activation state, in which the cutting element protrudes at least partially from the housing, and into a deactivation state, in which the cutting element is arranged within the housing. In particular, the housing may comprise an opening through which the cutting element may protrude when the cutting device is in the activation state. The housing may improve a security of the system, since in the deactivation state the cutting element is hidden in the housing and thus not accessible to a machine operator. Furthermore, the housing may protect the cutting element from environmental influences and/or from parts that may fall during maintenance work. As a result, the overall service life of the cutting element may be extended. For example, it is conceivable that the cutting element is at least partially movable out of the housing in order to establish the activation state. Preferably, the cutting element is pretensioned in the activation state, in particular such that the cutting element is automatically returnable into the housing to bring the cutting device into the deactivation state. In this regard, the housing may be rigid or movable.

Furthermore, in a system according to the invention it is conceivable that the housing of the cutting device comprises a displacement unit through which the housing is movable between a release position for producing the activation state and a closure position for producing the deactivation state, in particular wherein the housing is pretensioned into the closure position by the displacement unit. In particular, the displacement unit may be resiliently supported to realize the pretension into the closure position. Thus, switching between the activation state and the deactivation state may be realized by the housing itself. In particular, the cutting element may be rigidly configured. When the housing is in the release position, the cutting element may preferably protrude through an opening in the housing, wherein the opening may in particular be configured as a slot. In particular, a plurality of cutting elements arranged in series may be provided to protrude through individual slots of the housing in the activated state to allow cutting of the film tube. In addition or alternatively to a movement of the housing, a movement of the cutting element may be provided to switch between the deactivation state and the activation state. Thus, the cutting element may be moved through an opening in the housing. Furthermore, it is conceivable that in order to establish the activation state, a laser is switched on to perform the cutting of the first tube side. The adjustability of the housing has in particular the advantage that a movement of in particular the cutting element is not necessary and thus a safety of the system and/or the blown film line can be increased.

Furthermore, it is conceivable in a system according to the invention that the cutting device is arranged upstream of the guide unit in the transport direction of the film tube, so that the film tube can be cut by the cutting element before the film tube passes the guide unit. Preferably, it may be provided that the cutting device is arranged upstream of the constriction point in the transport direction of the film tube, so that the film tube is severable by the cutting element before the film tube passes the constriction point. By arranging the cutting element in front of the guide unit, it may be ensured that the air is releasable at this point. Alternatively, for example, the cutting device may be integrated, for example, into the guide unit itself, so that the air is releasable in particular immediately before the deflection. In particular, the cutting device may be provided upstream of the guide unit and downstream of the constriction point in the transport direction of the film tube. By arranging the cutting device upstream of the constriction point, the insertion of the cutting element into the first tube side can be realized in a simple manner. In particular, before the constriction point, the film tube may not yet be flattened, i.e. have a cylindrical and/or conical extension. In this way, it can be prevented in a simple manner that the cutting element also intersects a second tube side opposite the first tube side. At the same time, air can be released immediately after the constriction point if the cutting device is arranged upstream of the constriction point, since a pressure between an inner side and an outer side of the film tube can already be equalized when the tube section passes through the constriction point.

It is further conceivable in a system according to the invention that the processing unit comprises a stretching unit and/or a stretching unit is provided between the constriction point and the guide unit, through which a length expansion of the film tube can be influenced, in particular wherein the cutting device is arranged upstream of the stretching unit or within the stretching unit in the transport direction of the film tube. Furthermore, it is conceivable that the cutting device is arranged in the transport direction of the film tube between the constriction unit and the stretching unit or between the stretching unit and the guide unit. The stretching unit may, for example, be part of the guide unit. In particular, a pre-tensioning of the film tube, in particular in the transport direction, can be achieved by the stretching unit. As a result, the film properties of the film tube can be influenced, so that the quality of the film products can be improved. If the cutting device is already arranged in front of the stretching unit in the transport direction of the film tube, air can also already be released in this area or the accumulation of air can be prevented. An arrangement of the cutting device in the transport direction of the film tube after the stretching unit has the advantage that an access of an operator is not or only rarely necessary in this area, so that the safety of the system can be improved. Preferably, it may be provided that the stretching unit is configured to perform a stretching process. In this respect, two guide units in the form of pairs of rollers may be arranged one behind the other. Through the first pair of rollers, the film tube may be insertable into the processing unit. Further, the second pair of rollers may be operable at a higher rotational speed than the first pair of rollers to enable longitudinal stretching of film material of the film tube.

It is further conceivable in a system according to the invention that the cutting element is arranged in such a way that the cutting of the first tube side by the cutting element, in particular by cutting the cutting element into the film tube, takes place automatically if a certain amount of accumulated air is present in the tube section of the film tube between the constriction point and the guide unit. This can be implemented, for example, by the film tube being able to approach the cutting element up to a predetermined nominal distance or being transported to the cutting element at a predetermined nominal distance. If the predetermined amount of accumulated air in the tube section is reached, this generates in particular an air bubble in the tube section which is larger than the predetermined nominal distance of the cutting element to the film tube. In this case, the movement of the film tube causes a cutting to occur even in the case of a rigid cutting element. Preferably, the system, in particular the processing unit, comprises an air bubble sensor by which an actual amount of accumulated air in the film tube, in particular within the processing unit, can be monitored. It may be provided that the cutting device is activated when the actual quantity of accumulated air exceeds a target quantity. The target quantity can be predetermined or determined by the guide unit according to dynamic operating parameters during transport of the film tube.

Furthermore, it is conceivable in a system according to the invention that the guide unit has an air supply through which an air cushion can be formed between the film tube and the guide unit, in particular between a second tube side of the film tube and the guide unit. Through the air cushion, the deflection of the film tube at the guide unit can be carried out in particular without contact, i.e. in particular without contact between the guide unit and the film tube. The air supply can be implemented, for example, by channels in the guide unit, wherein the channels can end in openings in the region of the deflection of the film tube. The second tube side is in particular the tube side of the film tube opposite the first tube side. If the air cushion is formed on the second tube side, this has the advantage that the air supply does not again introduce air into the interior of the film tube through the tube section or the severing cut of the cutting element. Instead, the closed side of the film tube is used to form the air cushion. Thus, the air can also be kept low within the film tube during the further method of transporting the film tube.

Preferably, in a system according to the invention, it may be provided that the cutting device comprises a detection unit for detecting the film tube, in particular an edge region of the film tube. The detection unit may in particular comprise a sensor. The sensor may in particular be an optical sensor. By detecting the film tube, in particular the edge region of the film tube, it can be ensured that the cutting device cuts only the first tube side and does not score the film tube laterally even if the diameter of the film tube varies. Otherwise, this could lead to a further tearing of the film tube in the course of transport and/or the second tube side could be cut. Due to a web tension of the film tube along the transport direction, a cutting of the edge region of the film tube could in particular further present a notch which tears further during transport of the film tube. This can thus be prevented by detecting the edge region and, in particular, avoiding cutting through into the edge region.

Furthermore, in a system according to the invention, it may advantageously be provided that a movable sensor unit is provided for detecting a film parameter, in particular a thickness, of the film tube, and the cutting device is coupled to the sensor unit, so that when the sensor unit approaches the film tube, the film tube can be cut by the cutting element. In order to meet quality requirements for the film products, it may be provided that a film parameter, such as a density of the film material, a transparency and/or the like is sensed by the movable sensor unit. Preferably, the movable sensor unit may be an optical movable sensor unit. The coupling of the cutting device and the sensor unit may in particular be realized by integrating the cutting element into the sensor unit. Thus, only one drive for moving the sensor unit and the cutting element may be provided. Thus, at least two functions may be coupled so that a complexity in the configuration of the system may be reduced. Furthermore, the sensor unit may also improve an overall quality of the film product.

According to a further possibility, it may be provided in a system according to the invention that a guide unit is provided for actuating, i.e. in particular controlling and/or regulating, the cutting device. Advantageously, the guide unit, which may be a control and/or regulating unit, is in data communication with the cutting device, that is to say that in particular with drive of the cutting device and/or the drive unit responsible for moving the film tube along the transport direction. Preferably, the guide unit may comprise a processor and/or a microcontroller. The guide unit may further be part of the system, and/or one of the winding points. Thus, an increased automation of the blown film line may be achieved. It is further conceivable that the guide unit is associated with the blown film line and/or a winding point.

Furthermore, in a system according to the invention, it may advantageously be provided that the guide unit comprises a start module for controlling the cutting device for carrying out, in particular once, the cutting of the first tube side during an activation of the blown film line. During activation of the blown film line, the cut tubular section can be assigned to the scrap in a simple manner, so that a continuous material of the tubular film can subsequently be used at the winding points. Furthermore, it may be useful, particularly during activation of the blown film line, to open the film tube if the cutting device has not yet been inserted into the film tube during activation. Subsequently, the cutting device may remain in a cutting position so that the film tube is continuously cut. The activation of the blown film line may in particular be understood as the creation of a new film tube. In particular, a production of the blown film line may be stopped and/or interrupted before the activation. The activation of the blown film line thus provides a convenient time for controlling the cutting device. In particular, it can thus be provided during activation that a region of the film tube is provided as a reject anyway, so that the tube section, in particular with the severing cut, can also be disposed of without interrupting a film winding. Furthermore, during activation, a film bubble can be set via an internal pressure of the film tube, during which air can accumulate in particular in front of the constriction section at the processing unit. This can thus be eliminated or reduced by cutting the first side of the tube immediately during activation.

Furthermore, in a system according to the invention, it may advantageously be provided that the guide unit comprises a winding module for detecting a winding change at at least one of the winding points and for carrying out, in particular once, the cutting of the first tube side upon detection of the winding change. A winding change may comprise a transverse cutting of the entire film tube. Thus, during the winding change there may be a convenient time to restart the blown film line and/or to cut out a part of the film tube from the film tube. In this way, the severing cut is not introduced into the film product or can be arranged in a simple manner at the start of the winding or at the end of a winding. In this way, damage to film products of the winding points as a result of the severing cut can be avoided.

Furthermore, in a system according to the invention, it may advantageously be provided that the guide unit comprises a recording module for generating a winding record, in particular a digital winding record, through which a position of severance of the first tube side for the at least one film web can be assigned. The digital winding record may comprise information about a winding made from the film tube. By generating the winding record, the cut tubular section can be located and taken into account during a further processing of the winding. As a result, it may not be necessary to remove the cut tubular section from the film web prior to winding, for example. This can increase the production speed and/or reduce waste.

According to a further aspect of the invention, a blown film line for producing a film comprising a blow head from which a film tube is extrudable and a system, in particular a system according to the invention, for transporting the film tube along a transport direction is claimed. The blown film line has a processing unit with a guide unit for guiding the film tube, in particular when transporting the film tube, and a constriction point at which a width of the film tube can be reduced. Furthermore, the blown film installation comprises a cutting device with at least one cutting element for cutting the film tube. Thereby, the guide unit is arranged downstream of the constriction point in the transport direction of the film tube. Furthermore, the cutting device is configured in such a way that only a first tube side of a tube section of the film tube can be cut by the cutting element, so that air accumulated at the processing unit, in particular upstream of the constriction point and/or between the constriction point and the guide unit, can be released through the tube section of the film tube.

Thus, a blown film line according to the invention brings the same advantages as have already been described in detail with reference to a system according to the invention. Preferably, the system is thereby arranged downstream of the blow head in the transport direction of the film tube. For extruding the film tube from the blow head, an extruder may be arranged upstream of the blow head. By allowing air to be released within the system as the film tube is transported away from the blow head, unwanted bubble formation within the system can be reduced or avoided. As a result, contamination of the finished film product may be reduced. Further, film rupture can be reduced or avoided due to stresses in the film tube caused by air build-up.

Further, the blown film line and/or the system preferably comprises a drive unit for causing the film tube to move along the transport device. In particular, the drive unit may be downstream of the system. In particular, the film may be formed by separating the film tube into one, two or more film webs. However, it is equally conceivable that the film tube forms the manufactured film at least in sections, for example if the film is provided in a hood-like manner.

According to a further aspect of the invention, a method of producing a film, in particular by a blown film line according to the invention, is claimed. In this regard, the method comprises:

Extrusion of a film tube from a blow head,
Constricting of the film tube, in particular by a constriction point during transport of the film tube, so that a width of the film tube is reduced,
Guiding, in particular deflecting, the film tube after the width of the film tube has been reduced, in particular by a guide unit,
Cutting through only a first tube side of a tube section of the film tube, in particular by a cutting element of a cutting device, so that, after the film tube has been extruded, in particular before or after the film tube has been constricted and before the film tube has been guided, accumulated air is released through the tube section, in particular during the transport of the film tube.

Thus, a method according to the invention brings the same advantages as have already been described in detail with reference to a system according to the invention and/or a blown film line according to the invention. For extruding the film tube, it may be provided that plastic pellets are heated. In this regard, the heated composition may still be at least partially liquid when the film tube is extruded from the blow head. In particular, the film tube may have a frost line after extrusion from the blow head at which the film material of the film tube solidifies. Preferably, the cutting of the first side of the tube may take place in the transport direction of the film tube after the frost line. In this way, it can be ensured that a severing cut, which is preferably produced during cutting, is defined by a cutting element of a cutting device, in particular without deforming strongly due to the viscosity of the film material. Preferably, the deflection of the film tube may comprise a change in the transport direction and/or an angle of the transport direction of the film tube. Preferably, the film tube is redirected after the film tube has been laid flat as a flattened film tube. In particular, when the film tube is constricted, an inner region of the film tube, which may for example comprise air, may be reduced in volume or changed in shape at least such that the width of the film tube is reduced. The width of the film tube may in particular comprise an extension width, i.e. in particular a diameter of the film tube. When cutting the first tube side, in particular a cutting element of the cutting device is introduced into the film tube in such a way that a severing cut is formed which only affects and/or severs the first tube side. In particular, cutting the first tube side may also comprise piercing the first tube side. In particular, cutting the first tube side comprises loosening a material cohesion in the region of the tube section, so that an open cut is formed. In particular, the first tube side may be opposite a second tube side, the first tube side and the second tube side preferably forming two at least partially superimposed layers of film after the film tube has been constricted. Thus, the method according to the invention allows accumulated air to be released in particular during operation of the blown film line and/or during transport, i.e. in particular during movement of the film tube. This is preferably done by the tube section transporting the tube section along an area in which air has accumulated, i.e.

in particular before the deflection and/or before a guide unit. By the tube section having the severing cut, the air is released in particular when passing the area with accumulated air. In particular, in such a system, accumulated air within the film tube can form an overpressure which is released when the cut tube section passes the area. As a result, accumulated air can be avoided, which can lead to a reduction in impurities and/or improved quality of the film products produced from the film tube.

Preferably, in a method according to the invention, it can be provided that the film tube is laid flat during the constriction to form two film layers at least partially superimposed. In particular, the two at least partially superimposed film layers correspond to the first and the second tube side. In particular, the first tube side may form one of the two at least partially superimposed film layers and the second tube side may form the other of the two at least partially superimposed film layers. When extruding the film tube on the film blow head, the film tube may in particular extend in a cylindrical manner. By flattening, the cylinder-like structure is changed to a nearly two-dimensional structure. On the one hand, the flattened film tube can be transported more easily, i.e. can be deflected and/or controlled in the system, and on the other hand, before a winding point for winding at least one of the at least partially superimposed film layers, the flattened film tube can be cut open at the sides in order to obtain a flat film. Further packaging and/or transport solutions for the film products from the film tube can also be advantageously achieved as a result.

Preferably, in a method according to the invention, it may be provided that the film tube is cut several times, in particular transversely to a transport direction of the film tube and/or along a transport direction of the film tube, when the first tube side is cut. Thus, a perforation of the film tube may result, wherein a plurality of severing cuts in the film tube may cover larger areas of the film tube for releasing air. As a result, a transport speed of the film tube in the transport direction can be increased, since a delay in the release of air can be reduced when the accumulated air is released through the cut section of the tube. Thus, when cutting transversely to the transport direction, a larger area of the film tube can be covered in the transverse direction. By cutting along the transport direction, a large amount of accumulated air can be released through the cut tube section even at a high speed of the film tube. For multiple cutting of the first tube side, preferably a cutting element of a cutting device of the blown film line can be moved transversely to the transport direction and/or along the transport direction of the film tube.

Furthermore, in a method according to the invention, it may advantageously be provided that the film tube is moved towards a cutting element of a cutting device for cutting the first tube side, so that the cutting element performs the cutting. Thereby, it can be provided that the cutting element is formed passively and/or rigidly. Thus, for example, in a mechanical cutting device, a blade may be immovably formed so that the safety of the blown film line may be maintained even at high process speeds. When the film tube is moved towards the cutting element, the film tube can in particular be locally stretched, preferably with an elongation and/or force below a yield point of a film material of the film tube.

Furthermore, in a method according to the invention it is conceivable that the cutting of the first side of the tube is carried out before the film tube is deflected, preferably before the film tube is constricted. This may ensure that the air can escape at the correct location in the system. In particular, the film tube may be cut before the film tube is deflected and after the film tube is constricted. In this way, the accumulated air can escape immediately when the film tube is cut. If the film tube is already cut in before the film tube is constricted, a favorable positioning of a cutting device can be provided, for example, within the blown film line, whereby the first tube side can be cut in a particularly simple manner without damaging the second tube side. In particular, in a region before the film tube is constricted, the film tube may have a cylinder-like extension such that the first and second tube sides are spaced apart at least in sections. If the cutting is performed before the film tube is constricted, the escape of air after the cutting may be provided. In particular, air may also escape during further transport of the film tube along the transport direction.

It is further conceivable in a method according to the invention that a cutting device for cutting the first tube side is brought from a deactivation state, in which a cutting element of the cutting device is arranged within a housing of the cutting device, to an activation state, in which the cutting element protrudes at least partially from the housing. Thus, cutting of the blown film tube by the cutting element can be realized, in particular without the cutting element being accessible when the cutting element is not needed. As a result, the overall safety of the blown film line may be further improved since, for example, the cutting element is not freely accessible during maintenance operations. Furthermore, the cutting element itself may be protected and thus the reliability of the cutting may be improved, as for example falling parts and/or the like are prevented by the housing from damaging the cutting element.

It is further conceivable in a method according to the invention that the method comprises:

Stretching of the film tube, so that a length expansion of the film tube is influenced, in particular wherein the cutting of the first tube side is carried out before the stretching. By stretching the film tube, the linear expansion and thus in particular a film property of the film tube can be changed. In this context, air can also accumulate before the film tube is stretched, so that preferably the cutting of the first tube side is carried out before the stretching. The stretching may be carried out, for example, by a stretching unit, which may in particular be part of a guide unit of the blown film line. The quality properties of the film product can thus be improved by the stretching of the film tube, whereby in combination with the cutting there is the advantage that air which may have accumulated during the stretching of the film tube also does not have a detrimental effect on the quality property, in particular in other respects.

Furthermore, it is conceivable in a method according to the invention that the cutting of the first side of the tube takes place automatically if a certain amount of accumulated air is present in the tube section of the film tube between the constriction point and the guide unit. This can be implemented, for example, by arranging a cutting element at a predetermined nominal distance from the film tube and guiding the film tube past the cutting element. Thus, if the film tube is locally charged due to trapped or accumulated air, an elongation of the film tube changes, which becomes larger with increasingly accumulated air. Additionally or alternatively, an electronic control may be provided which, for example, establishes an activation state of a cutting device when a certain amount of accumulated air has been detected. For this purpose, for example, a sensor unit for detecting the accumulated air and/or an internal pressure of the film tube may be provided. In particular, small amounts of accumulated air may be harmless in the process, so that these amounts of accumulated air may be tolerated. The determined amount of accumulated air may be, for example, an amount of accumulated air critical for the quality properties of the film product and/or the film tube.

Furthermore, in a method according to the invention, it may advantageously be provided that the method comprises:

Formation of an air cushion during deflection of the film tube, in particular on a second tube side of the film tube.

The formation of the air cushion during the deflection of the film tube can enable the film tube to be guided, in particular without contact and/or without being contacted. In this way, it can be avoided, for example, that the film tube comes into contact with a guide unit, in particular a deflection roller. As a result, in particular surface properties of the film tube can be advantageously preserved and/or impurities can be avoided. Thus, the overall quality may be improved. If, furthermore, the formation of the air cushion is carried out on the second tube side, this has the advantage that no further air is introduced into the interior of the film tube by the air cushion and can thus possibly lead to bubble formation again. Instead, the closed, second tube side of the film tube can be in contact with the air cushion.

Furthermore, in a method according to the invention, it may advantageously be provided that the following is carried out before the first tube side is cut:

Detection of the film tube, in particular of an edge region of the film tube.

By detecting the edge portion of the film tube, it is possible to avoid damaging the edge portion when cutting the film tube. In particular, when extruding the film tube from the blow head, a diameter of the film tube may fluctuate. By detecting the film tube and/or the edge portion of the film tube, for example, a cutting element of a cutting device can be correspondingly adjusted for cutting. In this way, it can be avoided that notches are formed in the edge region of the film tube when the film tube is cut through, which notches can lead to tearing of the film tube when the film tube is subjected to tensile stress in the transport direction of the film tube. Thus, the method reliability can be improved.

Further, in a method according to the invention, it may advantageously be provided that the method comprises:

Approaching a sensor unit for detecting at least one film parameter of the film tube, wherein when the sensor unit approaches the film tube, the first tube side is cut. Thus, the detection of the film parameter and the cutting of the first tube side can be performed simultaneously. Thus, a plurality of stages of production for producing the film may be performed simultaneously and/or in coordination with each other, so that the method reliability may be improved and a complexity of the blown film line may be reduced. Furthermore, a number of drives of the blown film line can be reduced, so that cost advantages and/or safety advantages result.

Furthermore, in a method according to the invention it is conceivable that the cutting into the first tube side is carried out during an activation of the blown film line, in particular once. The activation provides an advantageous moment for cutting through the first tube side, in particular if a head portion of the film tube is produced as scrap during the activation anyway. The activation may be completed when a winding of the film webs onto at least one winder takes place.

Furthermore, in a method according to the invention, it may advantageously be provided that a winding of the film webs onto at least one winder, preferably of two film webs onto two winders, takes place, in particular wherein a cutting of the first tube side takes place upon detection of a winder change. A winding change may in particular be carried out in dependence on a packaging of film products of the film tube. In this case, a full winding may be removed from the winding point and an empty winding roll may be provided at the winding point. For this purpose, the blown film line can advantageously be stopped or reduced in its production speed. Thus, a tube section damaged by the cut can be identified and/or removed in a simple manner.

It is further conceivable in a method according to the invention that a winding record, in particular a digital winding record, is created through which a position of a severing cut of the first tube side for the at least one film web can be assigned. In this way, it may be possible, for example, to communicate the position of the severing cut and thus, in particular, of any damage to the tubular section to a further processing process. Thus, it may not be necessary to remove the cut tubular section already before winding.

BRIEF DESCRIPTION OF THE SEVERAL VIEWS OF THE DRAWINGS

Further advantages, features and details of the invention will be apparent from the following description, in which embodiments of the invention are described in detail with reference to the drawings. In this connection, the features mentioned in the claims and in the description may each be essential to the invention individually or in any combination. It schematically shows:

DESCRIPTION OF SPECIFIC EMBODIMENTS OF THE INVENTION

In the following description of some embodiments of the invention, the identical reference signs are used for the same technical features even in different embodiments.

Figure 1:
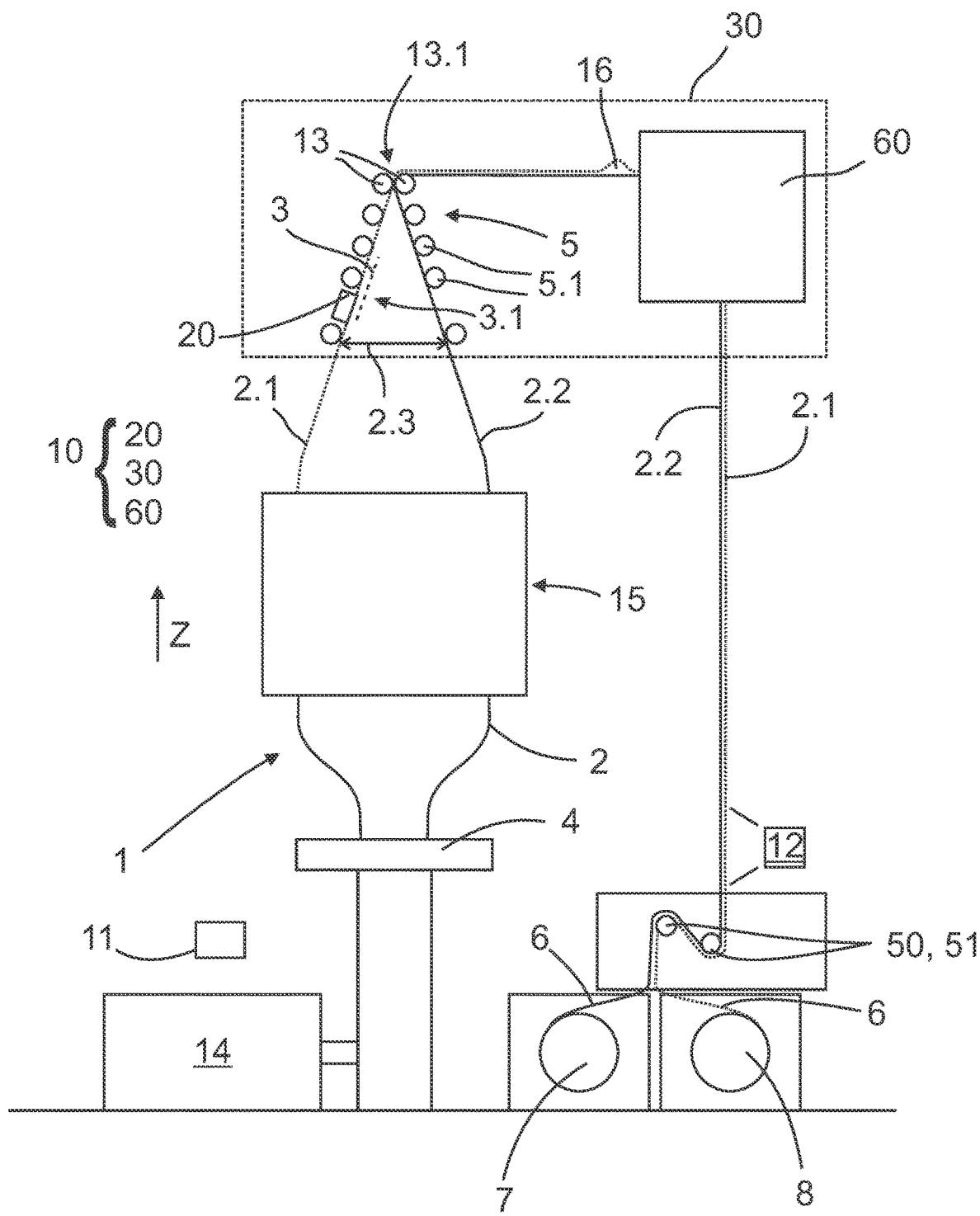
FIG. 1 a blown film line according to the invention with a system for transporting a film tube, FIG. 2 a deflection system of the system of the first embodiment, FIG. 3 a cutting device of the system of the first embodiment, FIG. 4 a method of producing a film according to the invention, FIG. 5 a cutting device according to a further embodiment, FIG. 6 a cutting device according to a further embodiment, FIGS. 7+8 a cutting device according to a further embodiment, FIG. 9 a system according to the invention for transporting a film tube in another embodiment, FIG. 10 a cutting element for a cutting device according to a further embodiment, and FIG. 11 a cutting device according to a further embodiment, FIG. 12 processing unit in the form of a stretching unit.

FIG. 1 shows a sketch of a blown film line 1, in which a film tube 2 is extruded by a blow head 4 and conveyed in the transport direction Z. The material of the film tube 2 is initially still present as a melt-like extrudate. Plastic is first plasticized in an extruder 14. The resulting mass is fed via a connecting line to the blow head 4, with which the film tube 2 is formed from the mass. Further extruders may be associated with the blow head 4, so that multilayer films can be produced. A method 100 according to the invention for producing a film by the blown film line 1 is shown in FIG.

4. In the following description of the blown film line 1, reference is also made to the method 100.

When extruding 101 the film tube 2 from the blow head 4 is initially present as a film bubble when leaving the blow head 4, in which there is a slightly increased internal pressure compared to the ambient pressure. Due to the increased internal pressure, the not yet solidified material of the film tube 2 expands. Ultimately, the diameter of the finished film tube 2 and/or the thickness of the film material are influenced in this way.

Subsequently, the not yet solidified film bubble or film tube 2 passes into the calibration device 15. Here, the diameter of the film tube 2 is limited. Within or below the calibration device 15, the film tube 2 cools down to a temperature at which subsequent deformation is hardly possible, in particular only with the use of greater forces. The position at which this phase transition takes place is often referred to as the "frost line".

After leaving the calibration device 15, the film tube 2 passes into a flattening device 5, in which the film tube 2 is almost completely formed into a flattened, double-layered film web. Thus, a flattening of the film tube 2 into a double-layered plastic film, which is connected in particular in edge regions, takes place by the flattening device 5. For this purpose, the flattening device 5 has guide elements 5.1 through which a gradual or continuous reduction of a width 2.3 of the film tube 2 is made possible.

In the present embodiment, the blown film line 1, in particular the flattening device 5, has a constricting point 13 with constricting rollers, in particular so-called nip rollers, which prevent a larger amount of air from remaining within the film tube 2 during its further transport. Preferably, one of the nip rollers or both nip rollers drivable to assist the transport of the film tube 2. By the flattening device 5 and/or the constricting points 13, a constriction 102 of the film tube 2 takes place, in which a width 2.3 of the film tube 2 is reduced when the film tube 2 is passed through the flattening device 5 and/or the constricting points 13. As a result, at least one constriction point 13.1 is formed by the flattening device 5 and/or the constricting points 13 in a system 10 according to the invention for transporting the film tube 2.

The film tube 2 is further conveyed over transport rollers, some of which are not explicitly shown, which can form further constriction points 13.1, in the direction of two winding points 7, 8. A drive unit 50 is provided for transporting the film tube 2, which in particular also applies a web tension to the film tube 2. The constricting points 13 and the constriction point 13.1 formed thereby, together with at least one guide unit 51 and/or a deflection system 60, form a processing unit 30, through which at least partial transport and/or further processing of the film tube 2 is made possible.

However, during the transport of the film tube 2 through the constriction point 13.1, in particular a smaller amount of air may be carried along, which may accumulate in the film in an air bubble 16 during the course of production. The accumulated air can, for example, form the air bubble 16 upstream of a deflection system 60, in particular upstream of a guide unit 51 for guiding 103, in particular deflecting 103, the film tube 2. In this case, air particles from the interior of the film tube 2 can, for example, be entrained through the constriction point 13.1 before being laid flat. In the region of the air bubble 16, the film tube 2 thus expands locally, which can already lead to negative influences on the quality of the film product. Furthermore, the air bubble 16 can cause an increased pressure between the film tube 2 and the guide unit 51, so that, if necessary, impurities can be pressed into the film tube 2 and thus lead to further quality losses.

In order to be able to release the air accumulated in the air bubble 16, a cutting device 20 is provided which has at least one cutting element 21 for cutting 104 the film tube 2. The cutting device 20 is configured in such a way that only a first tube side 2.1 of a tube section 3.1 of the film tube 2 can sever the cutting element 21, in particular the cutting element 21 can be introduced into the first tube side 2.1, so that accumulated air can be released through the tube section 3.1 at the processing unit 30, i.e. in particular here in front of the constriction point 13.1 and/or between the constriction point 13.1 and the guide unit 51. In the embodiment example shown here, the cutting device 20 is arranged in the area of the flattening device 5. However, alternative arrangements of the cutting device 20 are also conceivable, as shown for example in FIG. 9. The cutting of the film tube 2 thus produces a tube section 3.1 which is cut with a severing cut 3 and which moves with the transport of the film tube 2 in the transport direction of the film tube 2. When the cut tube section 3.1 passes the region between the constriction point 13.1 and the guide unit 51, the air trapped in the air bubble 16 can escape, in particular since the severing cut 3 allows access from an outer region to an inner region of the film tube 2. As a result, an excess pressure in the interior of the film tube 2 can be compensated.

Figure 2:
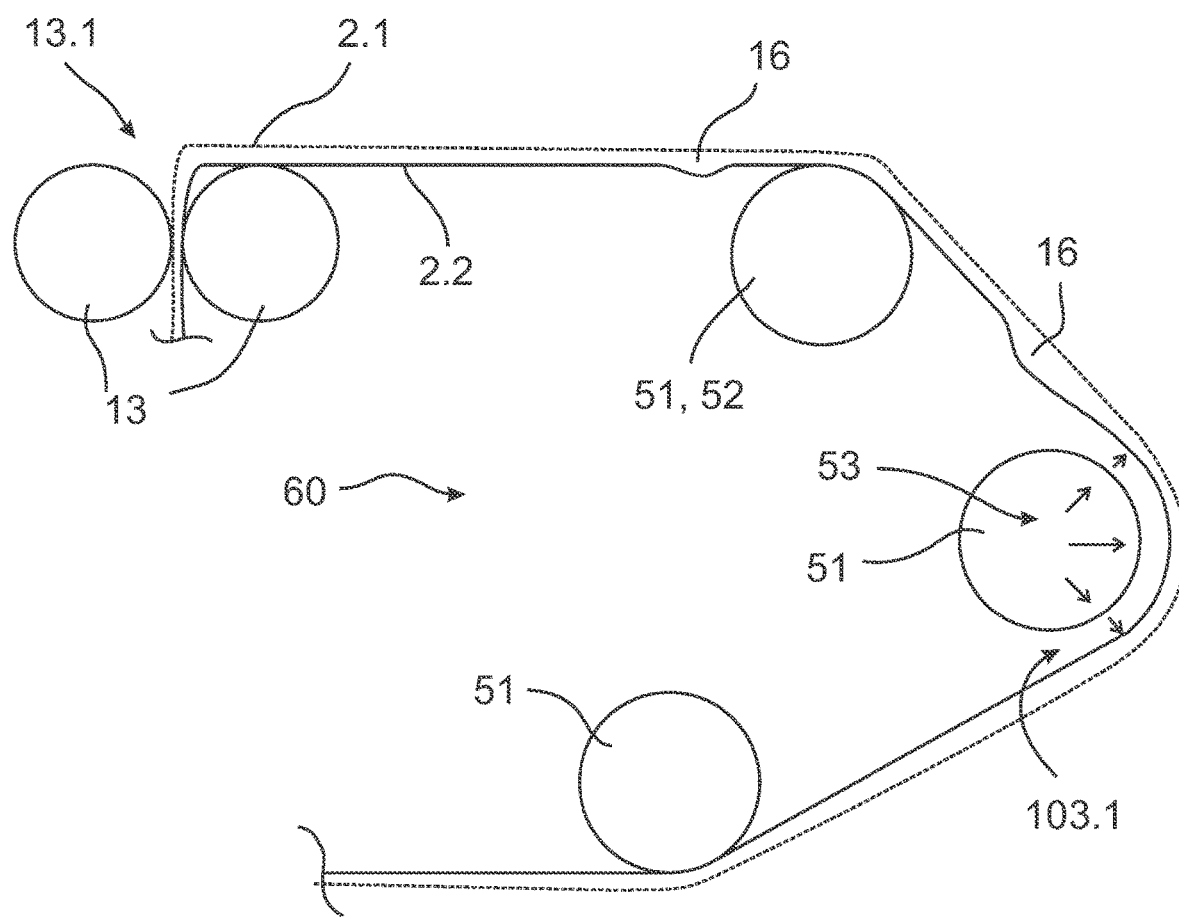

FIG. 2 shows in schematic representation a more detailed view of the constriction point 13.1 and of the deflection system 60 with several guide units 51. One of the guide units 51 comprises an air supply 53, through which it is possible to form 103.1 an air cushion between the film tube 2 and the guide unit 51, so that a contactless deflection of the film tube 2 or of the transport direction of the film tube 2 can take place at the guide unit 51. The guide unit 51 can be provided in particular as a rotatable or rigid roller. Due to the deflection, in particular due to a large angle in the deflection, an accumulation of air may be favored. Preferably, the guide unit 51 is further a cooling roller by which the film tube 2 can be cooled after extrusion 101 from the blow head 4. Furthermore, a stretching unit 52 can be provided between the guide unit 51 and the constriction point 13.1, through which a stretching 105 of the film tube 2 can be carried out. Through the stretching unit 52, the film properties of the film tube 2 can be influenced by introducing a stretch into the material. The stretching unit 52 may form a further guide unit 51 and/or a constriction point 13.1. Furthermore, the system 10 for transporting the film tube 2 may comprise further guide units 51 and/or further stretching units 52.

When the film tube 2 is cut 104 by the cutting device 20, only a first tube side 2.1 of the tube section 3.1 of the film tube 2 is cut. This leaves a second tube side 2.2 opposite the first tube side 2.2 as a closed film section. On the one hand, this has the advantage that, when the film tube 2 is wound up at the winding points 7, 8, only the first tube side 2.1 is damaged by the severing cut 3 and the tube section 3.1 with the severing cut 3 is fed to only one of the winding points 7, 8. Furthermore, it may be provided that the air supply 53 of the guide unit 51 is arranged in such a way that the air cushion between the film tube 2 and the guide unit 51 can be formed at the second tube side 2.2 of the film tube 2. As a result, air is not reintroduced into the film tube 2 by the air supply 53. In particular, a plurality of guide units 51 with a plurality of air supplies 53 may be provided, wherein preferably all air supplies 53 are configured to form an air cushion between the respective guide unit 51 and the second tube side 2.2.

Figure 3:
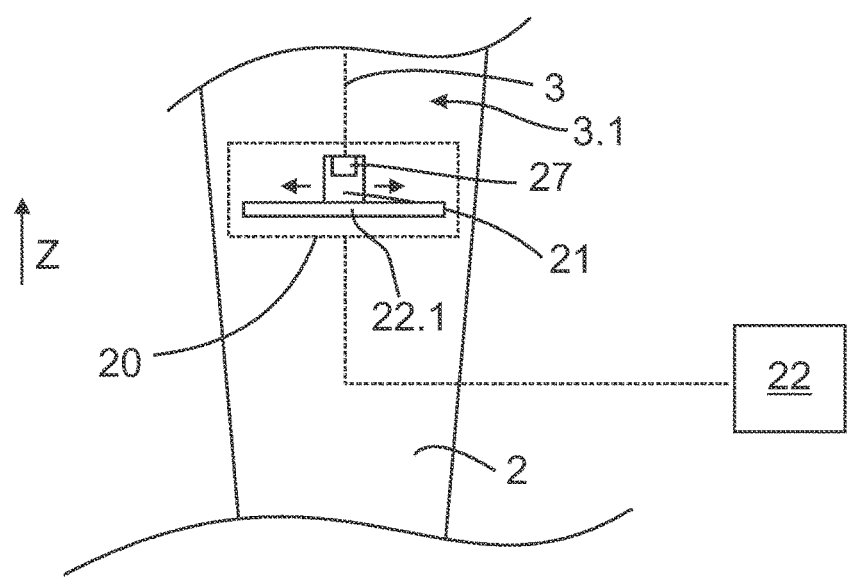
Figure 4:
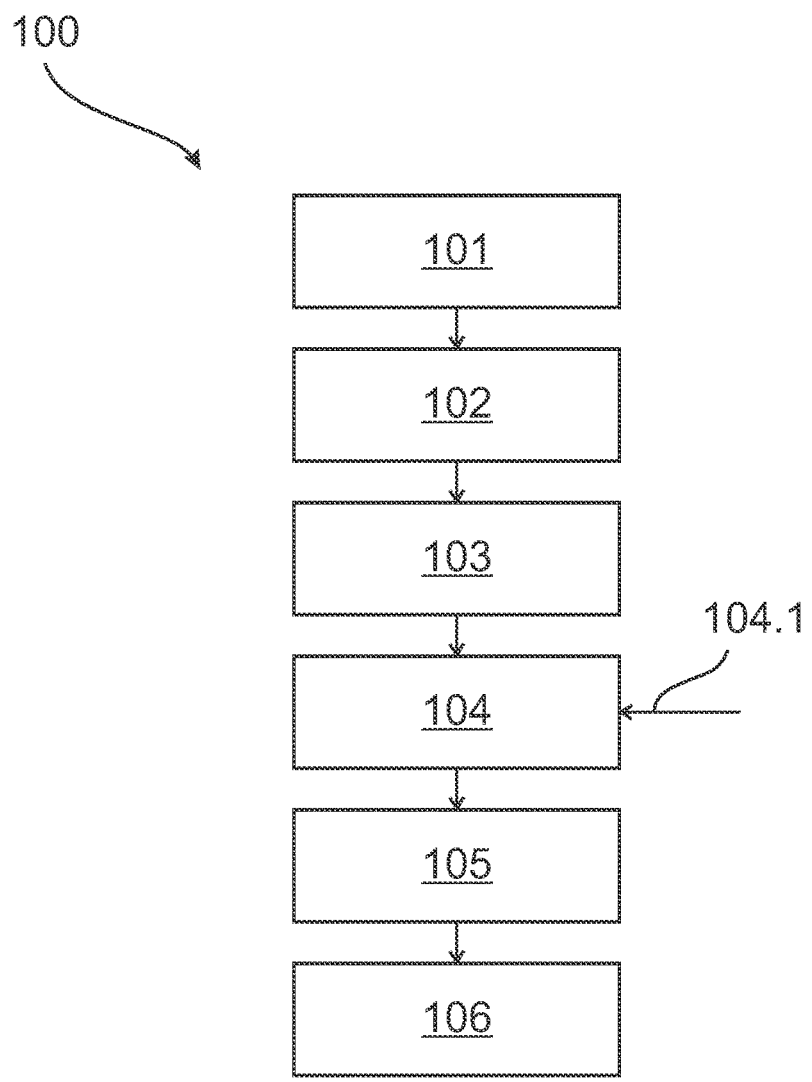

FIG. 3 shows the cutting device 20 in the area of the flattening device 5 in a further schematic representation. In this case, a drive 22 is provided through which the cutting element 21 of the cutting device 20 can be moved relative to the film tube 2 and/or to the flat-laying device 5. In particular, the drive 22 may comprise a transverse drive 22.1 by which the cutting element 21 is movable transversely to the transport direction Z of the film tube 2, in particular perpendicularly to the transport direction Z of the film tube 2. Preferably, the cutting element 21 is repeatedly movable towards and returnable from the film tube 2 by the transverse drive 22.1. As a result, a perforation of the film tube 2 can be made over an area of the film tube 2, so that the release of air in the area of the air bubble 16 can be improved. In particular, this allows an oblique cut pattern to be applied as the film tube 2 moves relative to the cutting element 21 and the cutting element 21 is moved transversely. Preferably, the cutting device 20 comprises a detection unit 27 configured to detect 104.1 the film tube 2, in particular an edge region of the film tube 2. In this way, it can be prevented that the cutting element 21 sets the severing cut 3 in the edge region of the film tube 2.

Figure 5:
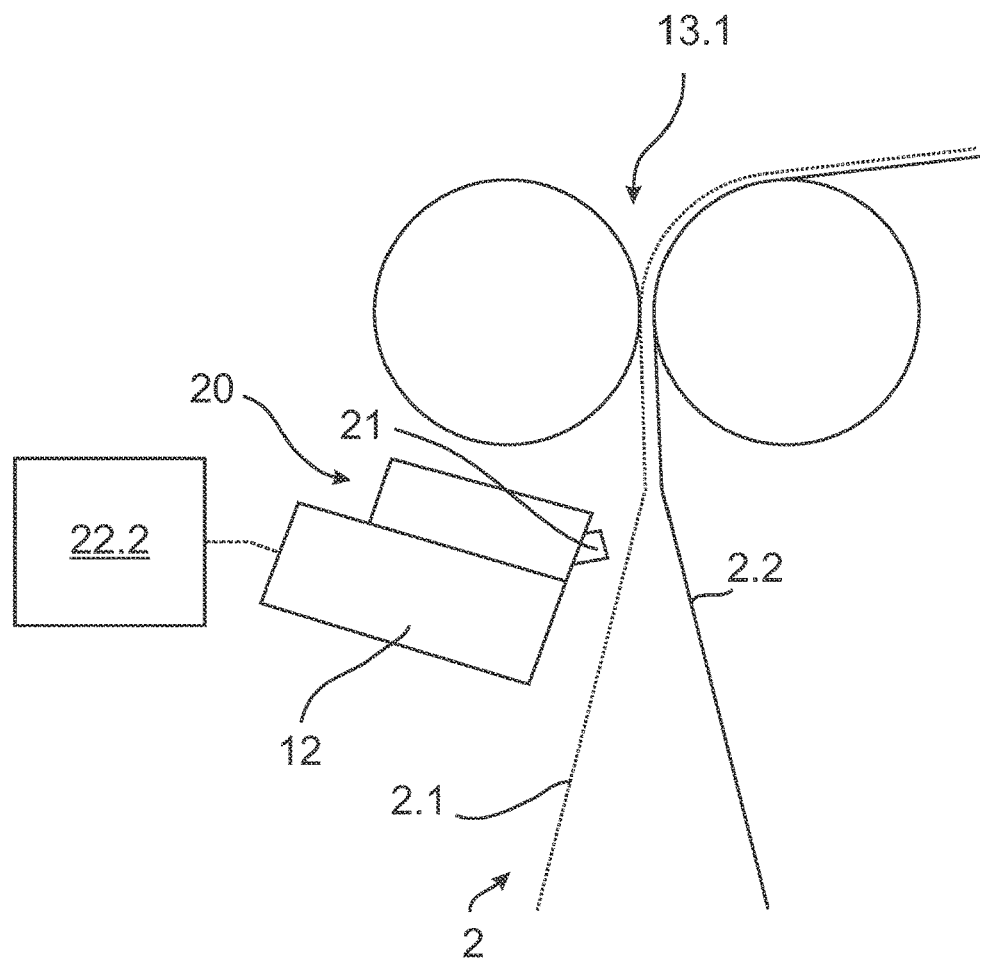

FIG. 5 also shows a side view of the cutting device 20. In order to be able to make a severing cut 3 in the first tube side 2.1 of the film tube 2, the cutting device 20 has a drive 22.2 for the cutting element 21. The drive 22.2 may for example be of manual, pneumatic, hydraulic and/or electric configuration. Preferably, the cutting element 21 and/or the drive 22.2 is coupled to a sensor unit 12 for detecting a film parameter of the film tube 2, so that the drive 22.2 can be used for both components. Therefore, if an approach 106 of the sensor unit 12 to the film tube 2 occurs, the severing cut 3 can be automatically introduced into the first tube side 2.1. As a result, the cutting element 21 can be moved towards the film tube 2 until the cutting element 21 is introduced into the film tube 2 at the first tube side 2.1. As a result of the movement of the film tube 2 during transport, the film tube 2 is then cut. The arrangement in the region of the flattening device 5 or at least in front of the constriction point 13.1 has the advantage that the severing cut 3 can be introduced in a simple manner only into the first tube side 2.1, in particular because here the film webs are still spaced apart from one another. In this case, the cutting element 21, in particular in the form of a knife, has a high tolerance range when it is inserted into the film tube 2, since the second tube side 2.2 is still spaced apart from the first tube side 2.1. As a result, during transport of the film tube 2, the cut tube section 3.1 first passes through the constriction point 13.1 and then through the entire area between the constriction point 13.1 and the guide unit 51, so that air can escape permanently during this process. Preferably, a detection 104.1 of the film tube 2 and/or of an edge region of the film tube 2 is carried out before the cutting element 21 is introduced into the film tube 2 by the drive 22.2. In particular, the detection 104.1 may be performed by the sensor unit 12. Additionally or alternatively, a sensor unit 12 may be arranged downstream of the deflection system 60 and/or upstream of a drive unit 50, in particular rigidly, in order to detect the tube section 3.1 and/or film properties of the film tube 2.

Figure 6:
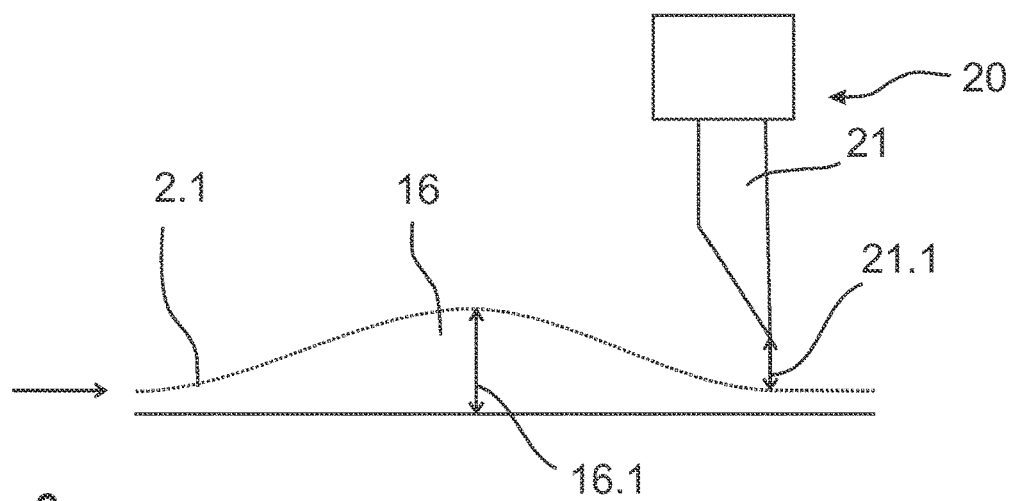

FIG. 6 shows a cutting device 20 for cutting a film tube 2 at only a first tube side 2.1 by a rigid cutting element 21. If air accumulates in the film tube 2, an air bubble 16 can form, which consequently inflates the film tube 2 locally. In this case, the rigid cutting element 21 is provided at a nominal distance 21.1 from the film tube 2, which is configured in such a way that cutting only takes place once a certain amount of accumulated air has been reached. Thus, when the air bubble 16 reaches a certain size 16.1 which is larger than the nominal distance 21.1 of the cutting element 21 to the film tube 2, cutting of the first tube side 2.1 can be performed automatically during transport of the film tube 2.

Figure 7:
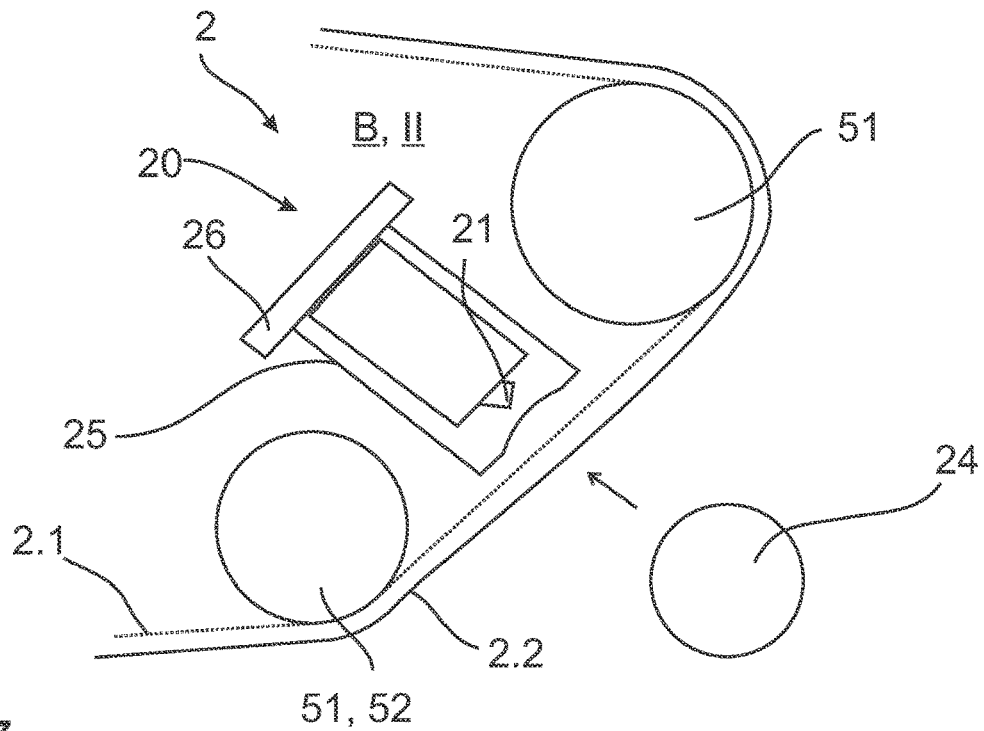
Figure 8:
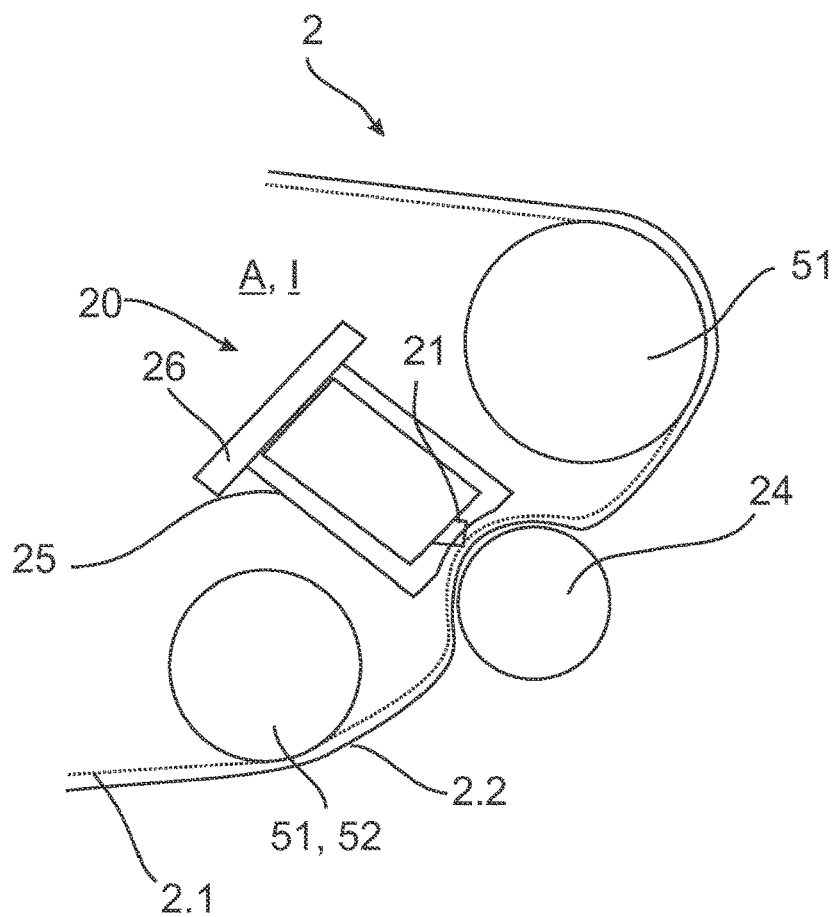

FIGS. 7 and 8 further show a schematic side view of a cutting device 20 in another embodiment. Here, the cutting device 20 comprises a cutting element 21 for cutting a film tube 2 at only a first tube side 2.1 of the film tube 2. The cutting element 21 is provided in a housing 25, so that the cutting element 21 is at least partially protected from environmental influences. It is further provided that the cutting device 20 can be brought into a deactivation state II, in which the cutting element 21 is arranged within the housing 25. The deactivation state II is shown in FIG. 7. FIG. 8 further shows an activation state I of the cutting device 20, in which the cutting element 21 protrudes at least partially from the housing 25. Thus, a cutting of the film tube 2 can be realized. Furthermore, the housing 25 comprises a displacement unit 26 through which the housing 25 is movable between a release position A for producing the activation state I and a closure position B for producing the deactivation state II. The displacement unit 26 can resiliently support the housing 25, such that the housing 25 is pretensioned towards the closure position B. Furthermore, a tube guide 24 in the form of a roller is provided, through which the film tube 2 can be moved towards the housing 25 and the cutting element 21. Thus, during the movement of the tube guide 24, the film tube 2 is pressed onto the housing 25, which is correspondingly moved into the release position A, so that the cutting element 21 protrudes through an opening, for example in the form of a slot, of the housing 25. This allows a first tube side 2.1 to be cut through by the cut-through element 21. Preferably, the cutting device 20 of the present embodiment may be provided immediately adjacent the guide unit 51, preferably between the guide unit 51 and a stretching unit 52. Here, bubble formation is likely, so that when the film tube 2 is pressed against the housing 25 or the cutting element 21, only a surface of an air bubble 16 of the film tube 2 and thus the first tube side 2.1 is cut in an advantageous manner. For this purpose, a nominal distance 21.1 of the cutting element 21 to the film tube 2 and/or to the tube guide 24 can be configured according to the nominal distance 21.1 as shown in FIG. 6.

Figure 9:
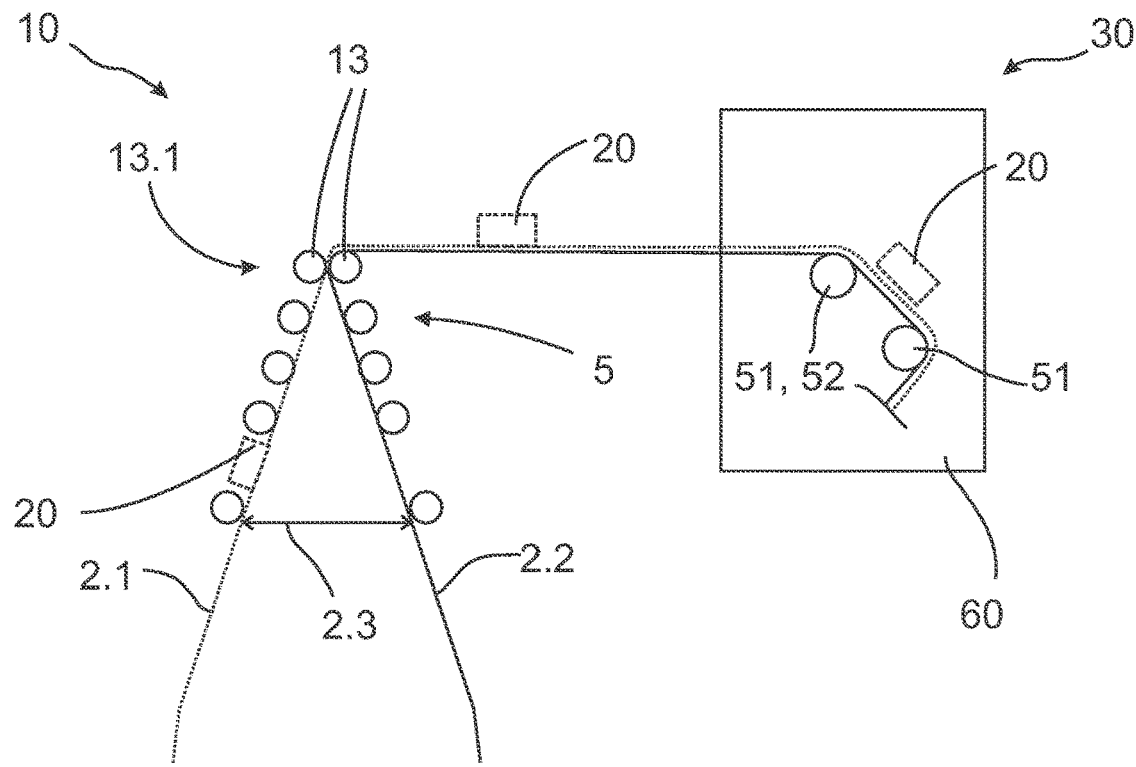

FIG. 9 shows a system 10 according to the invention in a further embodiment with a processing unit 30 as a subsection of a blown film line 1 according to the invention with different possible positions of a cutting device 20 for cutting 104 a film tube 2. In this case, the cutting device 20 can be arranged upstream of a constriction point 13.1 at which a width 2.3 of the film tube 2 is reduced. This has the advantage that the cutting of only a first tube side 2.1 of the film tube 2 is possible in a simple manner, since the first tube side 2.1 is still spaced apart from a second tube side 2.2. Furthermore, this allows air already accumulated before the constriction point 13.1 at the processing unit 30 to escape from the film tube 2. Furthermore, it is conceivable that the cutting device 20 is arranged between the constriction point 13.1 and a guide unit 51 for guiding, in particular deflecting, the film tube 2. Here, accumulated air is to be expected and can thus be released directly in the region in which it could possibly have a damaging effect. Furthermore, it may be provided that the cutting device 20 is provided between two guide units 51. For example, it may be provided that the first guide unit 51 has only a small angle to the deflection and consequently air still passes the first guide unit 51. Also, as a result of this, the cutting device 20 can be used at a point where accumulated air is expected to be present. In particular, the constriction point 13.1 can also be formed by a further guide unit 51 which is arranged in front of the guide unit 51, in particular in the transport direction of the film tube 2.

Figure 10:
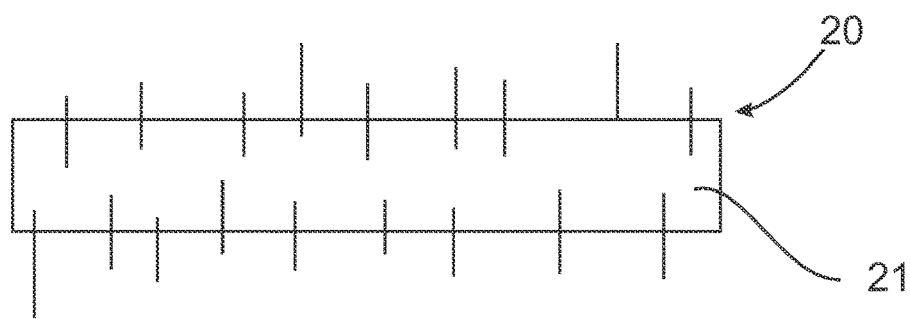

FIG. 10 shows a cutting device 20 in a further embodiment. In this case, the cutting device 20 has a cutting element 21 which is configured as a needle roller. The individual needles can thereby be introduced into the film tube 2, i.e. cut through the film tube 2 in order to perforate the film tube 2. This can also create a sufficient exchange between an inner region of the film tube 2 and an outer region of the film tube 2, in order to be able to release accumulated air.

Figure 11:
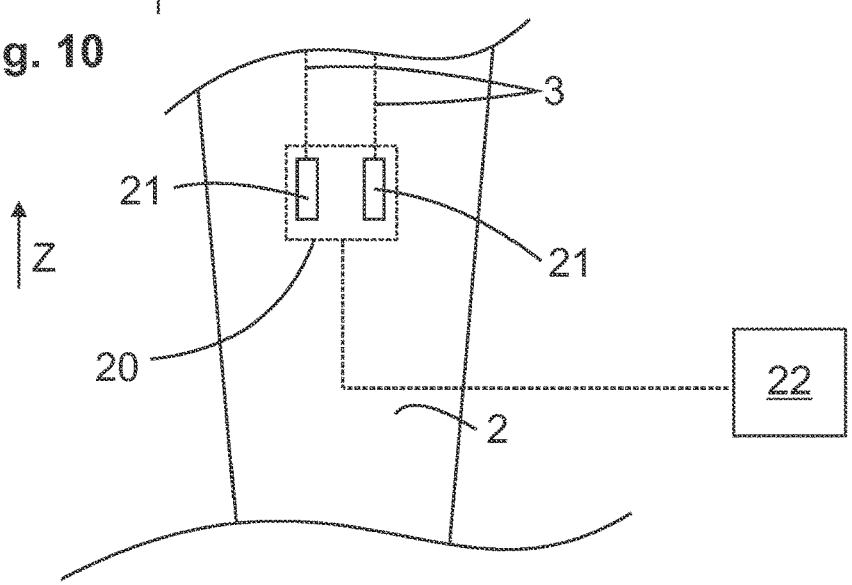

FIG. 11 further shows a cutting device 20 in another embodiment. In this case, the cutting device 20 has several, in particular two, cutting elements 21. In this way, two parallel severing cuts 3 can be achieved, so that a wide area of the film tube 2 can be covered to release accumulated air, in particular without transverse movement of the cutting elements 21.

Figure 12:
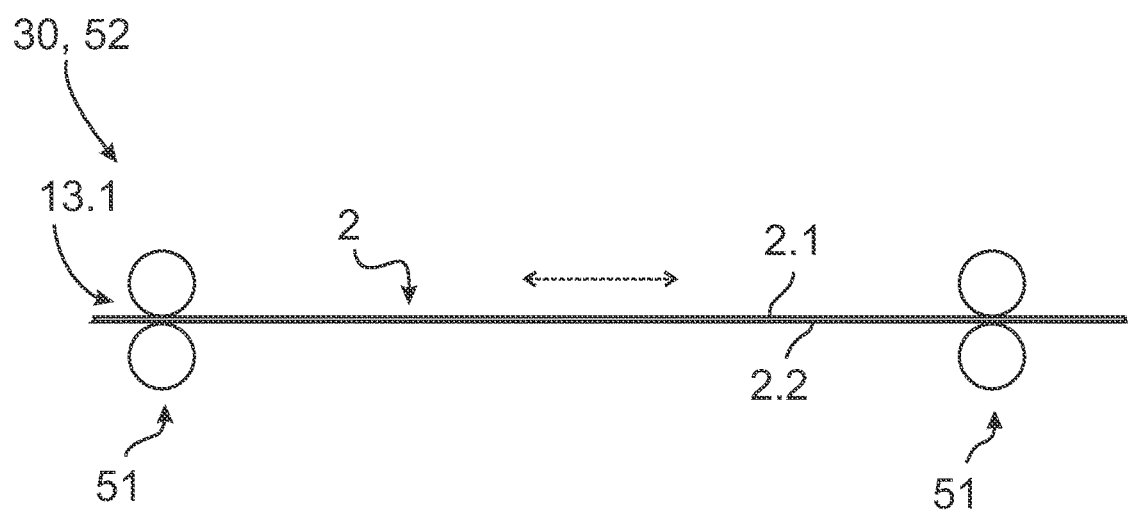

FIG. 12 shows a processing unit 30 in the form of a stretching unit 52 for carrying out a stretching process. Thus, two guide units 51 in the form of pairs of rollers are arranged one behind the other. Through the first pair of rollers 51 the film tube 2 is introduced into the processing unit 30, while through the second pair of rollers 51 with a higher rotational speed than the first pair of rollers 51 a longitudinal stretching, in particular as a stretching in left/right direction, as shown by the dashed arrow, takes place. Depending on a geometry, in particular edge geometry, of the film tube 2, an improved adhesion of the edge sections to the pairs of rollers 51 can preferably take place, so that a constriction or a reduction of the width of the film tube 2 transversely to the longitudinal direction is reduced or avoided. After longitudinal stretching, the edge sections may be cut off. The cut edge sections can then be recycled, for example, to the extent that they are recirculated as raw material.

The foregoing explanation of the embodiment describes the present invention by way of example only. Of course, individual features of the embodiments can be freely combined with each other, provided that this is technically reasonable, without leaving the scope of the present invention.

LIST OF REFERENCE SIGNS

1 Blown film line
2 Film tube
2.1 First tube side
2.2 Second tube side
2.3 Width of 2
3 Severing cut
3.1 Tube section
4 Blow head
5 Flatting device
5.1 Flatting guide
6 Film web
7 Winding point
8 Winding point
9 Tubular film level
10 System
11 Guide unit
11.1 Start module
11.2 Winder module
11.3 Record module
12 Sensor unit
13 Constriction points
14 Extruder
15 Calibration device
16 Air bubble
16.1 Size of 16
20 Cutting device
21 Cutting elements
21.1 Nominal distance
22 Drive
22.1 Traverse drive
22.2 Drive
23 Adhesion device
24 Tube guide
25 Housing
26 Displacement unit
27 Detection unit
30 Processing unit
50 Drive unit
51 Guide unit, in particular a roller
52 Stretching unit
53 Air supply
60 Deflection system
70 Auxiliary separation unit
71 Separation unit
100 Method
101 Extrude
102 Constriction
103 Guiding, especially deflecting
103.1 Forming of air cushions
104 Cut
104.1 Detection of 2
105 Stretching
106 Approach of 12
A Release Position
B Closure position
D Extensibility
H Retaining force
I Activation state
II Deactivation state
Z Transport direction

The invention claimed is:

1. A system for transporting a film of a blown film line along a transport direction, comprising
a processing unit with a guide unit for guiding a film tube and a constriction point at which a width of the film tube is reduced, and
a cutting device with at least one cutting element,
wherein said cutting device has an actuation means for moving the at least one cutting element in the direction of the film tube and
wherein said cutting device has:
at least several cutting elements arranged in series, or
a transverse drive for moving the at least one cutting element transversely to the transport direction of the film tube,
wherein the guide unit is arranged downstream of the constriction point in the transport direction of the film tube,
wherein the cutting device is configured in such a way that only a first tube side of a tube section of the film tube is cut by the at least one cutting element, so that air accumulated at the processing unit is released through the tube section.

2. The system according to claim 1,
wherein
a flattening device is provided for flattening the film tube to form two film layers which at least partially lie one on top of the other, the constriction point being formed by the flattening device.

3. The system according to claim 1,
wherein
the at least one cutting element is set at an oblique angle with respect to the transport direction of the film tube.

4. The system according to claim 1, wherein the actuation means has a drive for moving the at least one cutting element in the direction of the film tube or wherein the cutting device has a tube guide, through which the film tube is moved in regions towards the at least one cutting element.

5. The system according to claim 1, wherein at least the cutting device has a housing, it being possible for the cutting device to be brought into an activation state, in which the at least one cutting element protrudes at least partially from the housing, and into a deactivation state, in which the at least one cutting element is arranged within the housing or
wherein
the housing has a displacement unit through which the housing is moved between a release position for producing the activation state and a closure position for producing the deactivation state.

6. The system according to claim 1, wherein the cutting device is arranged in the transport direction of the film tube upstream of the guide unit, so that the film tube is cut through by the at least one cutting element before the film tube passes the guide unit.

7. The system according to claim 6, wherein the cutting device is arranged in the transport direction of the film tube upstream of the constriction point, so that the film tube is cut through by the at least one cutting element before the film tube passes the constriction point.

8. The system according to claim 1, wherein at least the processing unit has a stretching unit or a stretching unit is provided between the constriction point and the guide unit, it being possible to influence a length extension of the film tube through the stretching unit.

9. The system according to claim 1, wherein the at least one cutting element is configured to create an opening in the tube section of the film tube between the constriction point and the guide unit.

10. The system according to claim 1, wherein the guide unit has air channels to provide an air supply between the film tube and the guide unit.

11. The system according to claim 1, wherein the cutting device has a detection unit for detecting the film tube.

12. The system according to claim 1, wherein a movable sensor unit is provided for detecting a film parameter of the film tube, and the cutting device is coupled to the sensor unit so that when the sensor unit approaches the film tube, the film tube is cut by the at least one cutting element.

13. A blown film line for the production of a film with a blow head from which a film tube is extruded, and a system, for transporting the film tube along a transport direction, comprising:
a processing unit with a guide unit for guiding the film tube and a constriction point at which a width of the film tube is reduced, and
a cutting device with at least one cutting element for cutting the film tube,
wherein the guide unit is arranged downstream of the constriction point in the transport direction of the film tube,
wherein the cutting device is configured in such a way that only a first tube side of a tube section of the film tube is cut by the at least one cutting element, so that air accumulated at the processing unit is released through the tube section of the film tube; wherein said cutting device has an actuation means for moving the at least one cutting element in the direction of the film tube;
wherein said cutting device has at least several cutting elements arranged in series or a transverse drive for moving the at least one cutting element transversely to the transport direction of the film tube.

* * * * *